July 24, 1962 R. W. GRAHAM 3,045,701
ROTARY VALVE
Filed Sept. 12, 1958
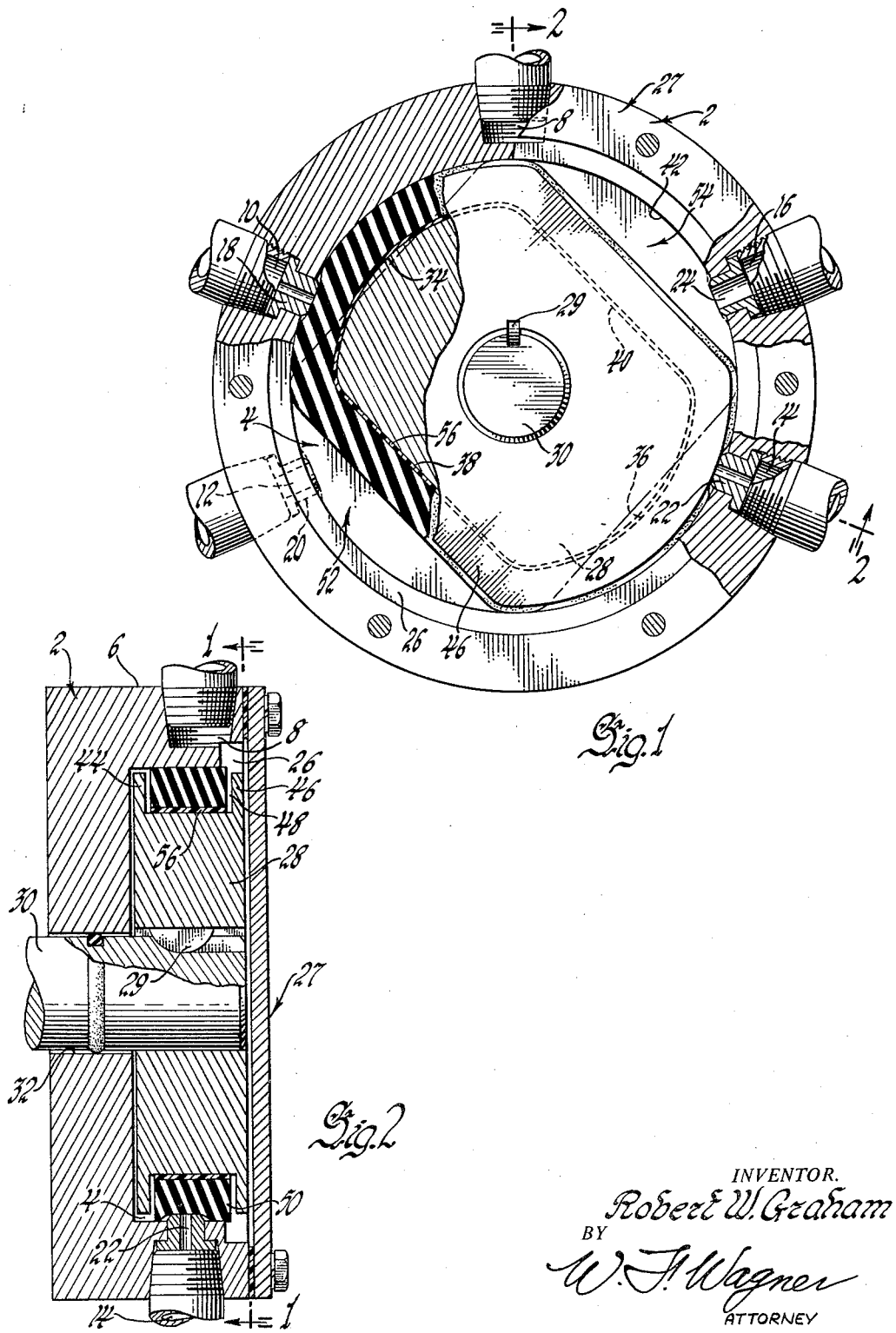
INVENTOR.
Robert W. Graham
BY
W. J. Wagner
ATTORNEY

United States Patent Office 3,045,701
Patented July 24, 1962

3,045,701
ROTARY VALVE
Robert W. Graham, Birmingham, Mich., assignor to General Motors Corporation, Detroit, Mich., a corporation of Delaware
Filed Sept. 12, 1958, Ser. No. 760,588
6 Claims. (Cl. 137—625.42)

This invention relates to fluid control mechanisms and more particularly to rotary valve structure for controlling flow of fluids through a plurality of conduits.

Rotary valves of the type including a cylindrical valve casing having a circular rotor disposed therein are well known in the prior art. Among the various forms known heretofore are those wherein the wall of the casing is provided with a plurality of circumferentially spaced ports or outlets. These various outlets are opened and closed selectively by angular movement of the rotor. In the usual case, the rotor is dimensioned so that a portion or all of the outer periphery thereof closely interfits the inner peripheral wall of the casing. It has also been proposed to provide the outer peripheral surface of the rotor with a coating or layer of flexible material, such as rubber, so as to insure effective sealing of the respective ports. However, this latter arrangement has heretofore proved unsatisfactory due to abrasion and cutting of the rubber by the port openings.

An object of the present invention is to provide an improved and simplified selector valve.

Another object is to provide a valve structure having a plurality of feed ports and including improved rotary type selector means.

A further object is to provide a valve having a selector rotor including a flexible peripheral band acting as the closure medium.

Still a further object is to provide an annular valve body having a plurality of radially directed feed ports formed therein and including a rotary closure having a flexible peripheral band disposed thereon, wherein portions of the rotor are concentric with the peripheral wall of the valve body and spaced therefrom a distance less than the thickness of the peripheral band so that only spaced portions thereof are compressively loaded.

Yet another object of the invention is to provide a valve of the stated character wherein a layer of low friction material is interposed between the resilient band and the periphery of the rotor thereby permitting differential angular travel of the band and the rotor.

Still a further object is to provide a rotary valve having high operating efficiency without requiring close mechanical tolerances, thereby permitting fabrication with little or no machining.

Still another object is to provide a valve structure which is simple in construction, low in cost, and easy to assemble.

These and other objects, advantages, and features of the invention will become more fully apparent as reference is had to the accompanying specification and drawings wherein:

FIG. 1 is an enlarged plan view, partly in section, with parts broken away to illustrate the structural relationship thereof; and FIG. 2 is a view looking in the direction of arrows 2—2 of FIG. 1.

In the drawings, reference numeral 2 designates a cylindrical valve body having a relatively shallow large diameter circular cavity 4 formed therein. At circumferentially spaced intervals, the wall portion 6 of valve body 2 surrounding cavity 4 is provided with an inlet port 8 and outlet ports 10, 12, 14, and 16. The outlet ports communicate with cavity 4 through orifices 18, 20, 22, and 24, while inlet port 8 communicates therewith via a counterbore 26 formed near the open end of body 2.

Rotatably disposed in cavity 4 is a truncated circular rotor 28, which is operatively connected by a Woodruff key 29 to a rotor shaft 30 extending through opening 32 in the closed end of body 2. As seen best in FIG. 1, the outer periphery of rotor 28 defines two diametrically opposite arcuate portions 34 and 36 and two straight walled portions 38 and 40. Arcuate portions 34 and 36 are generated concentrically with the inner peripheral wall 42 of bore 4, while the straight walled portions provide a substantial draft or clearance relative to said inner peripheral wall. After installation of rotor 28, a circular cover member 27 is secured over the open end of body 2 to close cavity 4. As seen best in FIG. 2, rotor 28 is provided with two continuous axially spaced flanges 44 and 46 which extend radially outwardly from arcuate portions 34 and 36 and flat portions 38 and 40 to define a peremetrical recess 48 in which is disposed a blanket or band 50 of elastomeric material such as rubber or flexible plastic. The thickness of band 50 is such that the portions thereof radially adjacent arcuate portions 34 and 36 are moderately compressed between such portions and the inner peripheral wall of the housing radially adjacent thereto. Similarly, the length of band 50 is such as to effect embracing engagement with the entire peripheral wall of the rotor, for which reason the portions of the band overlying straight wall portions 38 and 40 do not engage the adjacent peripheral wall of cavity 4.

By reference to FIG. 1, it will be apparent that communication between intake port 8 and outlet ports 12—16 is accomplished by angular movement of shaft 30 by any suitable means, not shown, to position the arcuate portions 34, 36 as shown. Conversely, movement to the opposite position wherein the respective arcuate portions are radially aligned with ports 12 and 16 effects communication between intake port 8 and outlet ports 10 and 14. With the rotor in the position shown in FIG. 1, it will be seen in FIG. 2 that air emerging from intake port 8 is free to circulate circumferentially in counterbore 26. Therefore, air may emerge from counterbore 26 into cavity 4 at both relieved portions 52 and 54 adjacent rotor straight wall portions 38 and 40 and thence pass out of cavity 4 through ports 12 and 16. In the event it is desired to close all of the outlet ports from communication with intake port 8, rotor 38 is moved angularly to a position wherein the straight wall portions 38 and 40 are horizontal.

In accordance with a principal feature of the invention, a thin layer of low friction material 56, as for example Teflon, is interposed between the inner peripheral wall of elastomeric band 50 and the periphery of rotor 38. Obviously the low friction material may also be applied directly to either the inner surface of the band or the outer periphery of the rotor. As a result of the feature described, the portion of the band in direct contact with the inner peripheral wall 42 of cavity 4 is not required to move angularly at a rate corresponding to the angular rate of movement of rotor 38. For this reason, relative surface movement between band 50 and wall 42 is greatly decreased, thereby eliminating the normal tendency toward chaffing and cutting of the elastomeric material as it passes over the ports. By virtue of the construction described, relatively large port openings may be utilized and the need for fine finishes and close tolerances is reduced to the point that semi-finished die castings may be utilized. In addition, because of the low rate of angular movement of band 50, orifices 18, 20, 22, and 24 may be arranged to proturde slightly inwardly of wall 42 and thus insure a more effective sealing action by band 50.

Although the construction just described virtually eliminates cutting and abrading action, according to another feature of the invention the device functions in such a way that if rotated continuously in one direction, band 50 moves or "walks" around the inner periphery 42 due to the difference in the length of the band 50 and the circumference of the inner periphery 42 of cavity 4, thereby assuring a new sealing surface over each port for each revolution of the rotor.

From the foregoing it will be seen that an extremely simple and efficient valve construction has been provided. In practice, it has been found that, notwithstanding the extreme simplicity of construction, the device affords a high degree of reliability under the most exacting conditions and extremes of pressure.

While but one embodiment of the invention has been shown and described, it will be apparent that other changes and modifications may be made therein. It is, therefore, to be understood that it is not intended to limit the invention to the embodiment shown, but only by the scope of the claims which follow.

What is claimed is:

1. Fluid control apparatus comprising a valve body having a cavity including a continuous circular wall portion, a plurality of ports extending through said wall portion at circumferentially spaced intervals, a discontinuous circular rotor in said cavity concentric with said circular wall, a band of elastic material embracing said rotor and simultaneously compressively engaging substantially spaced apart angular segments of said wall portion, and means forming a layer of low friction material between said rotor and said elastic material, whereby the rotor may be angularly oriented to any desired position relative to said ports without inducing significant frictional drag between said elasitc material and said circular wall portion.

2. In a rotary valve of the type having a cavity including a continuous circular wall formed with circumferentially spaced ports, a rotor movable about an axis concentric with said circular wall, the periphery of said rotor including opposed segmental arcuate portions concentric with said wall and relieved portions substantially spaced from said wall, an elastomeric band carried by said rotor for movement therewith and mounted on said rotor for movement relative thereto, the thickness of said band being sufficient to assure resilient engagement with the portion of said wall radially adjacent said rotor segmental portions and the length thereof being such as to assure embracing engagement with the entire periphery of said rotor, and anti-friction means between the band and rotor permitting relative angular movement therebetween.

3. The structure set forth in claim 2 wherein said low friction material is applied to said rotor.

4. The structure set forth in claim 2 wherein said low friction material is applied to said band.

5. In a rotary valve of the type having a counterbored valve body cavity defining a main circular wall formed with circumferentially spaced ports and a secondary circular wall of greater diameter than the main circular wall, a rotor movable in said cavity about an axis concentric with said main circular wall, a cover plate secured to said body closing said cavity, the periphery of said rotor including a segmental arcuate portion concentric with and slightly spaced from said wall and straight portions substantially spaced from said wall, and an elastomeric band surrounding said rotor, said band being dimensioned lengthwise so as to assure clasping engagement with the entire periphery of said rotor, the thickness of said band being sufficient to assure resilient engagement with said wall adjacent said rotor segmental portion, said counterbore forming with said cover plate an annular passage communicating at all times with the spaces between the straight portions of said rotor and said circular wall.

6. The structure set forth as in claim 5 wherein an individual port is formed and arranged in said valve body so as to be in constant communication with said annular passage irrespective of the position of said rotor.

References Cited in the file of this patent

UNITED STATES PATENTS

| | | |
|---|---|---|
| 109,730 | Hanks | Nov. 29, 1870 |
| 2,431,593 | Strike | Nov. 25, 1947 |
| 2,485,723 | Fitzgerald | Oct. 25, 1949 |
| 2,534,577 | Courtot | Dec. 19, 1950 |
| 2,567,527 | Parks | Sept. 11, 1951 |
| 2,728,550 | Sinkler | Dec. 27, 1955 |
| 2,735,446 | Boyce | Feb. 21, 1956 |
| 2,872,944 | Ludwig | Feb. 10, 1959 |

FOREIGN PATENTS

| | | |
|---|---|---|
| 713,999 | Great Britain | Aug. 18, 1954 |

UNITED STATES PATENT OFFICE
CERTIFICATE OF CORRECTION

Patent No. 3,045,701                                July 24, 1962

Robert W. Graham

It is hereby certified that error appears in the above numbered patent requiring correction and that the said Letters Patent should read as corrected below.

Column 3, line 31, for "elasitc" read -- elastic --; column 4, lines 27 and 28, for "individual" read -- additional --.

Signed and sealed this 20th day of November 1962.

(SEAL)
Attest:

ERNEST W. SWIDER
Attesting Officer

DAVID L. LADD
Commissioner of Patents